US008528267B2

(12) United States Patent
Saura Garcia et al.

(10) Patent No.: US 8,528,267 B2
(45) Date of Patent: Sep. 10, 2013

(54) WALKWAY OR PASSAGEWAY COVER

(75) Inventors: Javier Saura Garcia, Madrid (ES);
Carlos Alarcon Pedroche, Madrid (ES);
Martin Norbert Birtel, Düsseldorf (DE)

(73) Assignee: Capotex 2000, S.L. (ES)

( * ) Notice: Subject to any disclaimer, the term of this patent is extended or adjusted under 35 U.S.C. 154(b) by 0 days.

(21) Appl. No.: 12/994,331

(22) PCT Filed: Nov. 23, 2009

(86) PCT No.: PCT/ES2009/070520
§ 371 (c)(1),
(2), (4) Date: Jul. 21, 2011

(87) PCT Pub. No.: WO2011/061357
PCT Pub. Date: May 26, 2011

(65) Prior Publication Data
US 2011/0271607 A1   Nov. 10, 2011

(51) Int. Cl.
*E04B 7/02* (2006.01)
(52) U.S. Cl.
USPC .................. 52/86; 52/66
(58) Field of Classification Search
USPC ............ 52/63–66, 86, 173.1; 135/90, 97, 135/121, 124, 128–130, 136, 137, 906; 405/132, 134, 136
See application file for complete search history.

(56) References Cited

U.S. PATENT DOCUMENTS

| | | | | |
|---|---|---|---|---|
| 2,817,344 A * | 12/1957 | Teeter | ............................ | 135/129 |
| 3,844,404 A | 10/1974 | Emmenegger | ................ | 198/204 |
| 6,145,526 A * | 11/2000 | Quiring et al. | ............. | 135/120.3 |
| 6,223,879 B1 | 5/2001 | Schöps | ......................... | 198/321 |
| 6,260,694 B1 | 7/2001 | Sasahara | ..................... | 198/860.4 |
| 6,505,638 B1 * | 1/2003 | Powell et al. | .................. | 135/124 |
| 6,564,513 B2 * | 5/2003 | Henbid et al. | ..................... | 52/86 |
| 6,874,735 B1 | 4/2005 | Audyli | ......................... | 244/137.1 |
| 2003/0019167 A1 * | 1/2003 | Baume et al. | .................. | 52/79.1 |

FOREIGN PATENT DOCUMENTS

| | | | |
|---|---|---|---|
| DE | 35 10802 | | 10/1986 |
| GB | 1518053 | * | 7/1978 |
| GB | 2 295 595 | | 6/1996 |
| JP | 2002-155597 | | 5/2002 |

OTHER PUBLICATIONS

International Search Report mailed May 26, 2011 issued in corresponding International Application No. PCT/ES2009/070520 (5 pages).

* cited by examiner

*Primary Examiner* — Brian Glessner
*Assistant Examiner* — Beth Stephan
(74) *Attorney, Agent, or Firm* — Ostrolenk Faber LLP

(57) ABSTRACT

Dimensionally adequate for the transit of persons in its interior, the main characteristic of which lies in the fact that it consists of a self-supporting, modular and removable cover, which allows simple and fast assembly, independent of said conveyor belt, in addition to subsequent folding in a horizontal position for those times of year when said cover is not used, giving it a high degree of watertightness and resistance to strong winds, with ensuing benefits in terms of visual impact and respect for the natural landscape, in addition to the possibility of using the entire outer surface of the cover as an advertising medium.

10 Claims, 8 Drawing Sheets

WALKWAY OR PASSAGEWAY COVER

CROSS REFERENCE TO RELATED APPLICATIONS

The present application is a 35 U.S.C. §371 National Phase conversion of PCT/ES2009/070520, filed Nov. 23, 2009, the disclosure of which is incorporated herein by reference.

OBJECT OF THE INVENTION

The present invention belongs to the field of transport or storage devices and, more specifically, protective roofs, overturns and support arches.

The main object of the present invention is a walkway or passageway cover, especially applicable for covering ski resort conveyor belts.

BACKGROUND OF THE INVENTION

At present, protective covers and, in particular, covers for conveyor belts specially indicated for transferring debris and waste generated in construction and/or demolition works are known to exist. Said covers generally have an inverted U-shape and are disposed serially one after another in the form of individual covers, being made of corrugated steel sheets. These covers are disposed on a support structure, on rails or similar elements, and are fixed by to a support structure by means of fastening ties.

In order to inspect or repair said conveyor belts, these individual covers are equipped with flip-top covers or inspection openings in certain zones thereof. Incorporation of these openings requires making cuts in pre-established zones of the individual covers. This has the drawback that those zones of the individual covers where the cuts are made are weakened, in addition to the danger posed to persons by the edges of the cut, which can cause serious injuries thereto.

On the other hand, the manufacturing process of these covers is complex, as the desired zones for the inspection openings must be indicated beforehand, representing an additional workload from the technical viewpoint.

More specifically, covers for conveyor belts destined for installation at ski resorts, for transporting skiers from one to slope to another, are also known to exist. These existing covers, especially aimed at inexperienced and learner skiers, has major drawbacks among which the following must be highlighted:

They are permanent covers, installed the year round, with the ensuing visual impact on the mountain landscape.

They have insufficient watertightness, which allows the filtration of powdery snow and all types of particles inside the cover, affecting the proper functioning of the conveyor belt and even causing it to become stuck and/or break.

They are vulnerable to strong winds, causing the covers to overturn and fall.

They require complicated assembly, which favours the aforementioned idea of leaving them permanently installed the year round.

Their constituent materials show deficiencies in the long term, with defects in the joining and fixing systems, causing infiltrations and damage to their parts.

They are very expensive, due to their complicated assembly and the materials used.

DESCRIPTION OF THE INVENTION

The present invention resolves the aforementioned drawbacks, providing a walkway or passageway cover, especially applicable in ski resorts for protecting and covering conveyor belts, dimensionally adequate for the transit of persons in their interior, the main characteristic of which lies in the fact that it consists of a self-supporting, modular and removable cover which allows simple and fast assembly, in addition to subsequent folding in a horizontal position for those times of year when said cover is not used.

The walkway or passageway cover that is the object of the present invention is comprised of several longitudinally interconnected modules, through which we obtain an adaptation of the cover to the particular orography of the terrain where it is installed, wherein each of the modules is formed of:

corrugated profile arches, preferably made of metal sheet, that may be flip-top or folding by effecting a 90° rotation for installing in a horizontal position for closing and protecting the cover, sheets made of a transparent material, preferably of polycarbonate, disposed between each two of the aforementioned arches and which are positioned overlapping these, of circular and arched configuration, giving the cover a tubular, tunnel-like appearance, support means that constitute the support or base of the cover on the ground or pavement, stabilising and fastening the cover thereto, and tensing means that embrace and fasten the sheets to the arches, relating them to the support means.

Preferably, fixing means related to the support means are also disposed in the lower part of the arches and sheets that are adapted to receive the ends of the tensing means.

The tensing means preferably comprise bands, made of steel or any other material (polymer, rubber, rope, etc.), perimetrally disposed over the sheets and arches so as not to reduce visibility, having tensioners at their ends adapted for hooking over the fixing means. These tensing means guarantee continuity in the union between modules that ensures their watertightness, providing a solution based on a compact inter-module union.

The fixing means of the cover are preferably comprised of:

counterweights disposed facing each other on either side of the arches, which can be filled with liquid, adapted for providing structural resistance and firmness to the cover, preferably having a rectangular and horizontal configuration, which can have an oblique, arched and centered lug, the outer walls of which are adapted to receive and couple the lower ends of each of the arches of the cover, and longitudinal tie beams, preferably of triangular configuration, having hooking orifices for fixing the band tensioners, and which are installed over the counterweights.

Additionally, continuous footings which can be folding are preferably disposed, which are destined for filling the space created between each two counterweight lugs and can be equipped with a grid in their central inner part, adapted for ventilating and circulating the air inside the cover.

Preferably, the counterweights are hollow and made of plastic material, manufactured by rotational moulding, while the continuous footings are made of a soft plastic material, adapted for cushioning and protecting the persons being transported in the interior of the cover in case of falls or blows.

Likewise, it is worth mentioning the great flexibility achieved as a consequence of the special corrugated configuration of the arch profiles, which allow adaptation to the different slopes or inclinations of the ground where the cover will be installed. On the other hand, this corrugated arch profile favours and also ensures better settling, grip and support of the sheets over the arches.

Finally, the support means preferably comprise support structures formed by three joining arms, disposed facing each other underneath the counterweights, interjoined by transverse tubular profiles adapted for greater stability of the cover. Likewise, it has been envisaged that, with the object of regulating the height of both the support structures and the transverse tubular profiles, fixed and/or mobile adaptable legs will be disposed, allowing adaptation of each module to the different heights of the terrain where the cover that is the object of the invention will be installed.

Likewise, the cover that is the object of the invention shall preferably have emergency exit means, adapted so that a person being transported therethrough can quickly exit without having to reach the end thereof. Said emergency exit means preferably comprise three activation and control modes:

- a personal automatic mode, wherein the person who is in the interior of the cover presses a push-button that activates actuation motors adapted for opening an exit door in the sheet, in such a manner that, by means of an upward sliding movement of said door, sufficient space is created for the person to pass through it,
- a general automatic mode, wherein the person(s) supervising the cover, positioned at the start and end thereof, activate an automatic mechanism by means of which all the cover actuation motors are started up, simultaneously opening each and every one of the emergency exit doors of the cover,
- an external manual mode, wherein a person who is located outside of the cover activates a device that produces the aperture of said emergency exit door.

Likewise, it is worth mentioning that the walkway or passageway cover that is the object of the invention affords a person being transported in the interior of the cover a full view of the exterior, enjoying an unsurpassable sensation of comfort and open space, thanks to the high degree of transparency obtained in practically all the outer surface of the cover.

On the other hand it has been envisaged that, due to the special configuration of the cover: smooth, flat and without projections throughout its outer surface, said outer surface may be inscribed, in such a manner that it constitutes an advertising medium throughout its length, without reducing the visibility of the persons being transported in its interior.

It has also been envisaged that, in case of using the cover described herein at ski resorts to cover conveyor belts, said cover shall be equipped with devices disposed at the start and end thereof, which are adapted for activating/deactivating the conveyor belt, whether by means of manual push-buttons, presence sensors or similar.

Additionally, for the purpose of giving the cover an extra touch of sophistication, elegance and exclusivity, the presence of luminous devices by way of beacons has been envisaged, installed throughout the cover, inside and/or outside thereof. Similarly, it is possible to install audio devices in the interior of the cover, in such a manner that the distance covered in the interior of the cover that is the object of the invention is made more enjoyable by means of piped music or similar.

Therefore, the present invention provides a walkway or passageway cover, especially applicable to ski resort conveyor belts, which is self-supporting, modular, removable, highly watertight and resistant to strong winds, and the assembly of which is simple and independent of said ski belt, also allowing folding and protection thereof during those months of the year when it is not used, with the ensuing benefits in terms of visual impact and respect for the natural landscape, also being usable as an advertising medium.

DESCRIPTION OF THE DRAWINGS

For the purpose of complementing the preceding description and with the object of helping to better understand the characteristics of the invention, a set of drawings in accordance with a preferred embodiment thereof has been included as an integral part of said description, wherein the following have been represented in an illustrative and non-limiting manner.

PREFERRED EMBODIMENT OF THE INVENTION

In accordance with a preferred embodiment of the invention shown in FIGS. 1-9, the cover that is the object of the invention is destined for protecting and covering ski resort conveyor belts.

Figure 1:
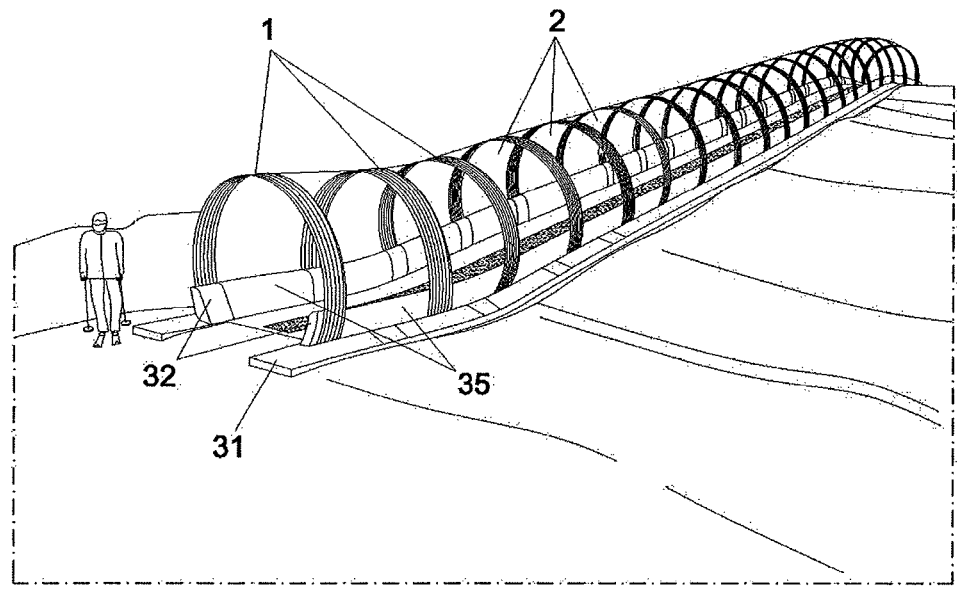
FIG. 1 shows a general perspective view of a cover for ski conveyor belts wherein its adaptability to the special mountain orography can be observed.

Said cover is comprised of several longitudinally interconnected modules, by means of which an adaptation of the cover to the special mountain orography where the ski slope is installed can be obtained, as represented in FIG. 1.

Figure 6:
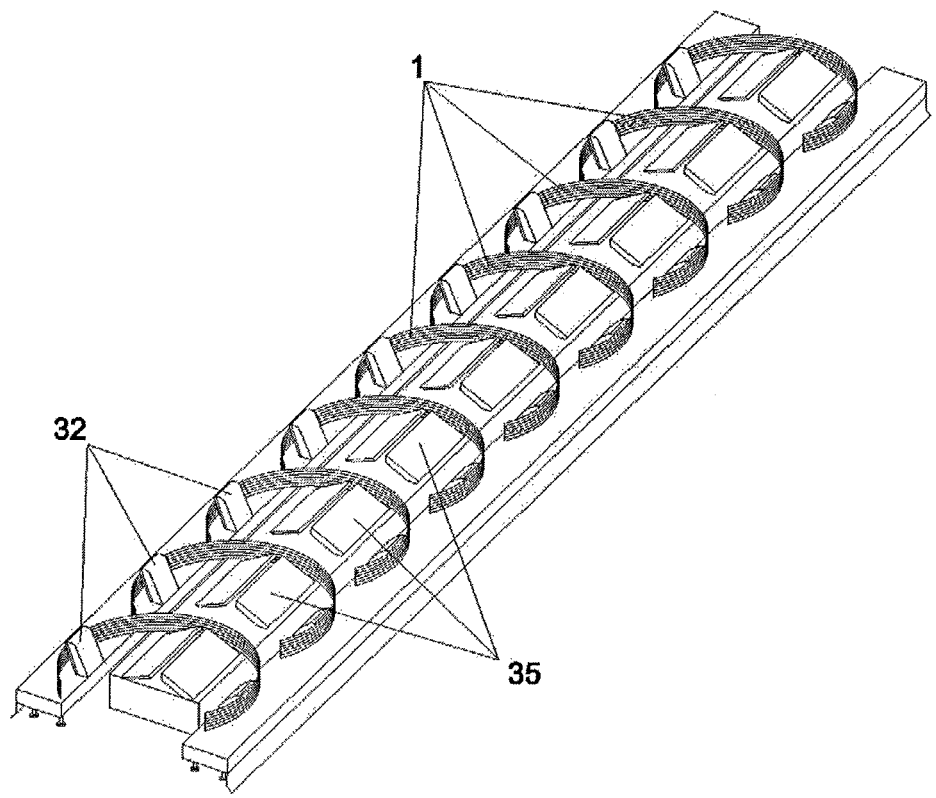
FIG. 6 shows a perspective view of the cover once folded and closed during those times of year when it will not be used.

Each of these modules is formed by:

- arches (1) having a corrugated profile, made of metal sheet and folding by effecting a 90° rotation for closing and protecting the cover, as can be observed in FIG. 6,
- transparent polycarbonate sheets (2), shown in FIGS. 1, 2, 3 and 7, disposed between every two arches (1) and overlapping these, having a circular and arched configuration,
- support means (10) that constitute the support or base of the cover on the ground or pavement, stabilising and fastening it thereto,
- tensing means (20), that embrace and fasten the sheets (2) to the arches (1), relating these to the support means (10) and,
- fixing means (30), related to the support means (10), disposed at the lower part of the arches (1) and sheets (2) and which are adapted to receive the ends of the tensing means (20).

Figure 3:
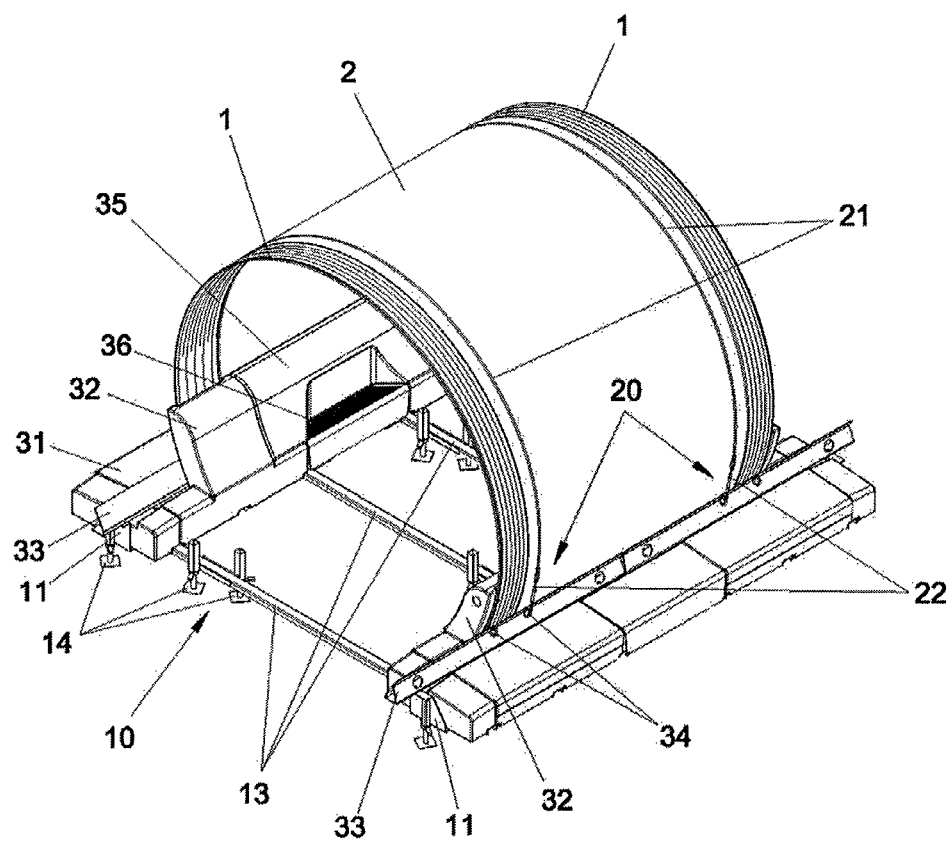
FIG. 3 shows a perspective view of one of the modules that form the cover that is the object of the invention.

FIG. 3 shows one of the modules that form the cover that is the object of the invention, wherein two arches (1) and a sheet (2) made of intermediate polycarbonate can be observed. Said figure also shows the tensing means (20), which comprise metal bands (21) perimetrally disposed around the sheets (2) and over the arches (1), which have tensioners (22) disposed at their ends, adapted for hooking onto the fixing means (30).

For their part, the fixing means (30) of the cover are comprised of:

hollow counterweights (31) made of a plastic material, manufactured by rotational moulding, disposed facing each other at either side of the arches (1) and destined for being filled with liquid, giving the cover structural resistance. Said counterweights (31) have a rectangular and horizontal configuration, where an oblique and arched lug (32) is disposed at the centre of the sides proximate to the interior of the cover, the outer walls of which are adapted to receive and couple the lower ends of each of the arches (1) of the cover, longitudinal beams (33), shown in FIGS. 3, 4 and 5, of triangular configuration, having hooking orifices (34) on their rear side, installed horizontally over the counterweights (31), in such a manner that the lower ends of the arches (1) are fixed between the beams (33) and the counterweight (31) lugs (32), and folding continuous footings (35), shown in FIGS. 1, 2, 3 and 6, made of soft plastic material, adapted for cushioning and protecting skiers in case of falls or blows, and destined for filling the space created between each two counterweight (31) lugs (32). Said continuous footings (35) can be equipped with grids (36) adapted for ventilating and circulating the air in the interior of the cover, as can be observed in FIGS. 3, 7 and 9.

Figure 4:
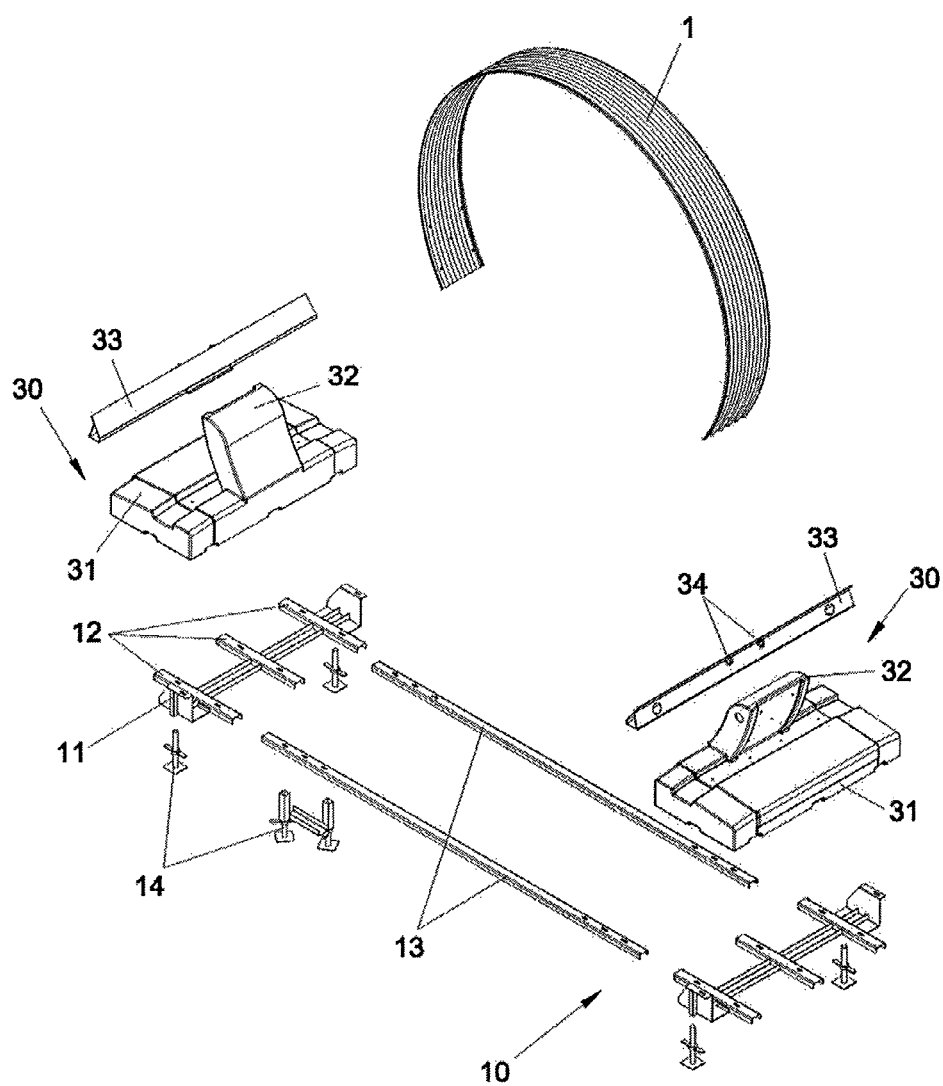
FIG. 4 shows an exploded view of the elements that form the walkway or passageway cover that is the object of the invention, not including the sheets of transparent material, the tensing means and continuous footings.
Figure 5:
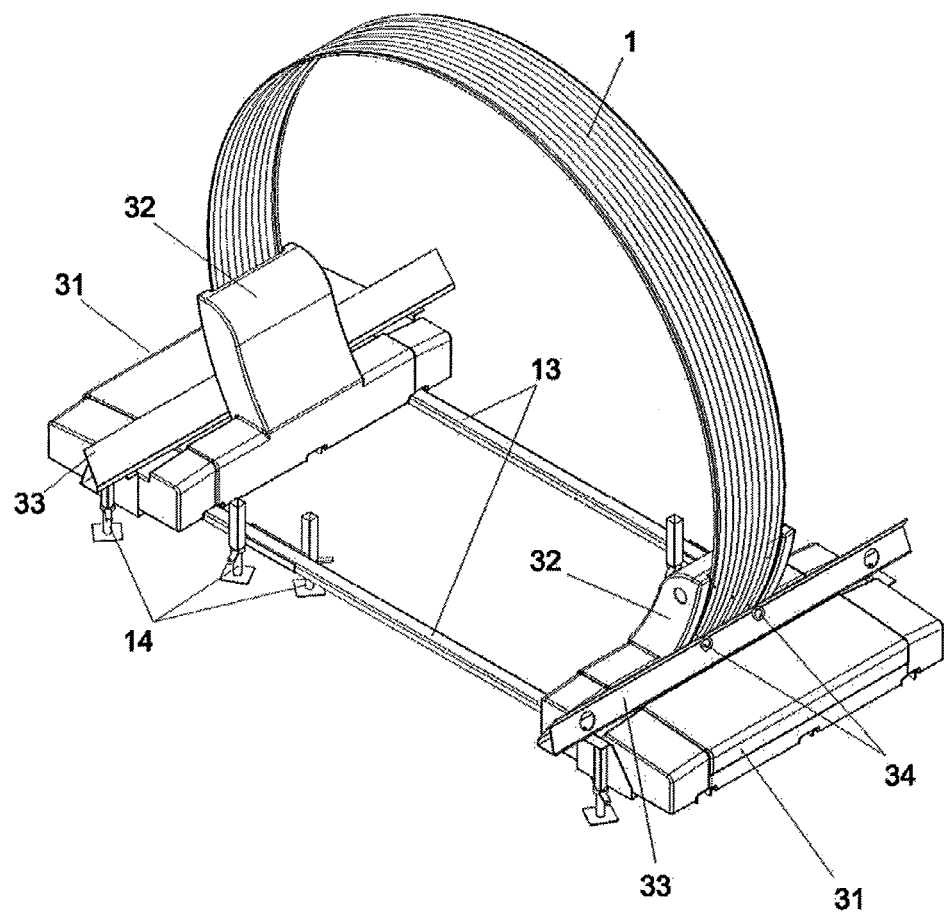
FIG. 5 shows a perspective view of the elements of FIG. 4 once assembled and joined together.

Likewise, FIGS. 3, 4 and 5 show the support means (10), which comprise support structures (11) formed by three joining arms (12), disposed facing each other underneath the counterweights (31), joined together by transverse tubular profiles (13) adapted for giving the cover greater stability.

Likewise, it has been envisaged that the support means (10) shall additionally comprise fixed and/or mobile adaptable legs (14) allowing adaptation of each module to the different heights of the ski slope where the cover that is the object of the invention will be installed.

Figure 2:
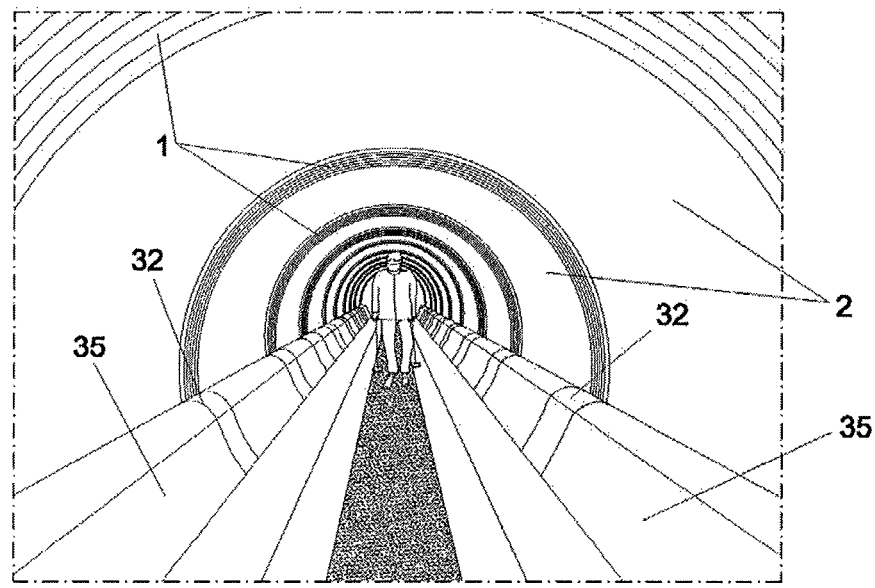
FIG. 2 shows an internal view of the cover of FIG. 1, where a skier is represented being transported by the conveyor belt.

FIG. 2 shows an internal view of the cover, wherein a skier can be observed being transported along a conveyor belt. In said figure we can observe that the skier enjoys a full view of the exterior, affording him/her a sensation of comfort and open space thanks to the transparent polycarbonate sheets (2).

Figure 7:
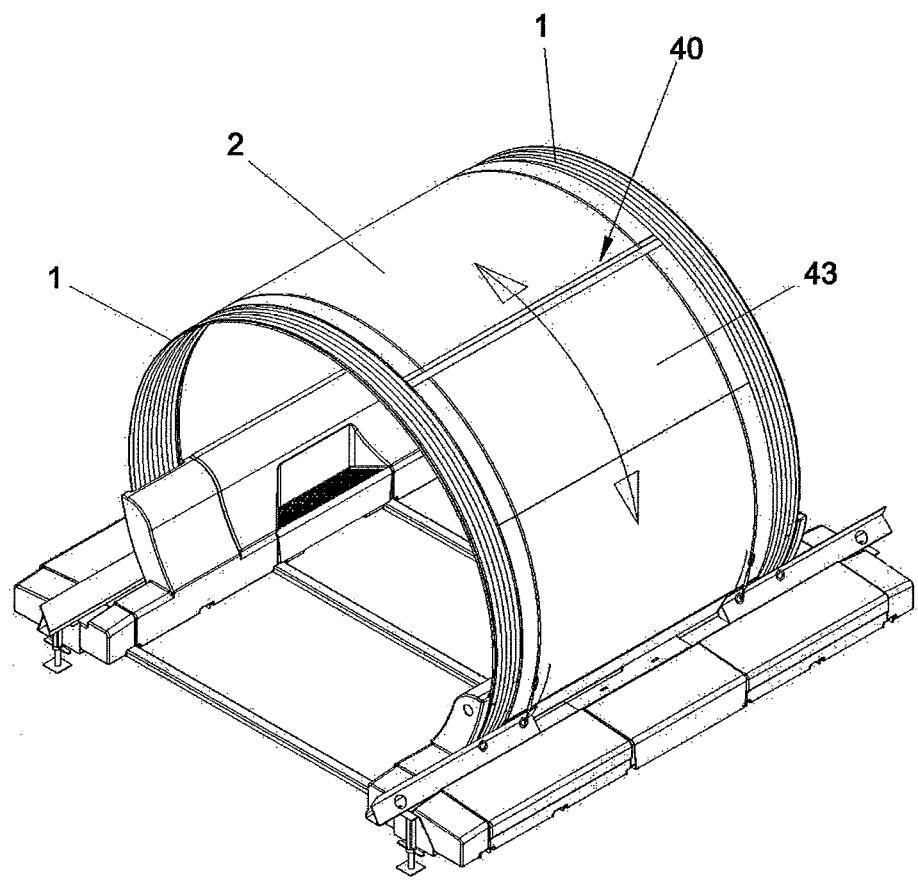
FIG. 7 shows a view of one of the modules that comprise the walkway or passageway cover that is the object of the invention, which has an emergency exit.
Figure 8:
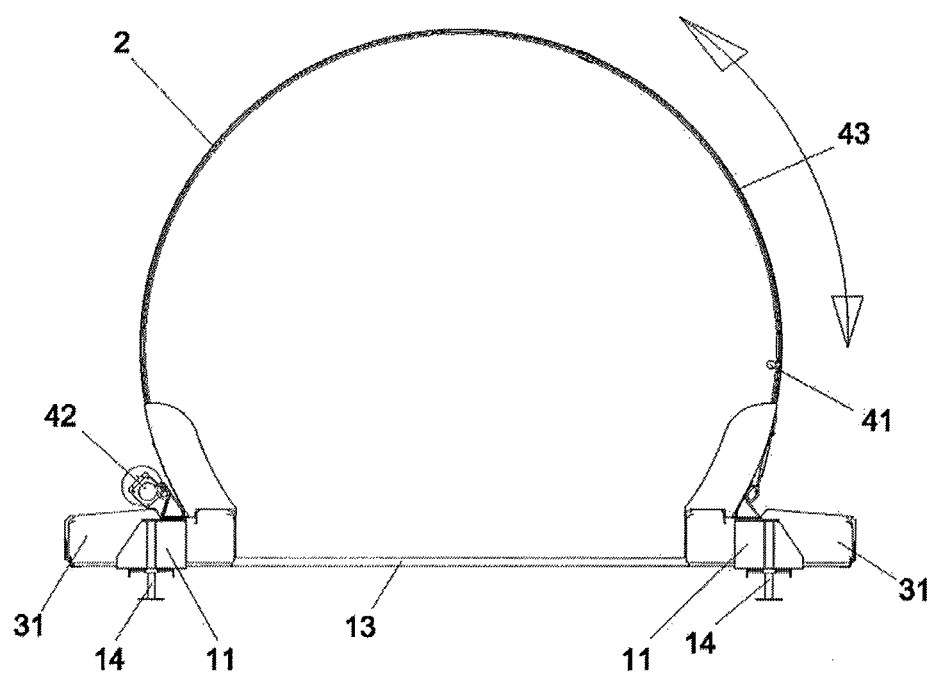
FIG. 8 shows a front elevational view of the cover of FIG. 7, wherein the motors in charge of actuating the aperture of the emergency door can be observed.

Likewise, as can be observed in FIGS. 7 and 8, the cover that is the object of the invention has emergency exit means (40) adapted so that a skier being transported in the interior of the cover can quickly reach the exterior without having to reach the end thereof. Said emergency exit means (40) comprise three activation and control means:

a personal automatic mode, wherein the skier who is in the interior of the cover presses a push-button (41) that activates actuation motors (42) adapted for opening an exit door (43) in the sheet (2), in such a manner that, by means of an upward sliding movement of said door (43), sufficient space is created for the person to pass through it, a general automatic mode, wherein the person(s) supervising the cover, positioned at the start and end thereof, activate an automatic mechanism by means of which all the cover actuation motors (42) are started up, simultaneously opening each and every one of the emergency exit doors (43) of the cover, an external manual mode, wherein a person who is located outside of the cover activates a device that produces the aperture of said emergency exit door (43).

Figure 9:
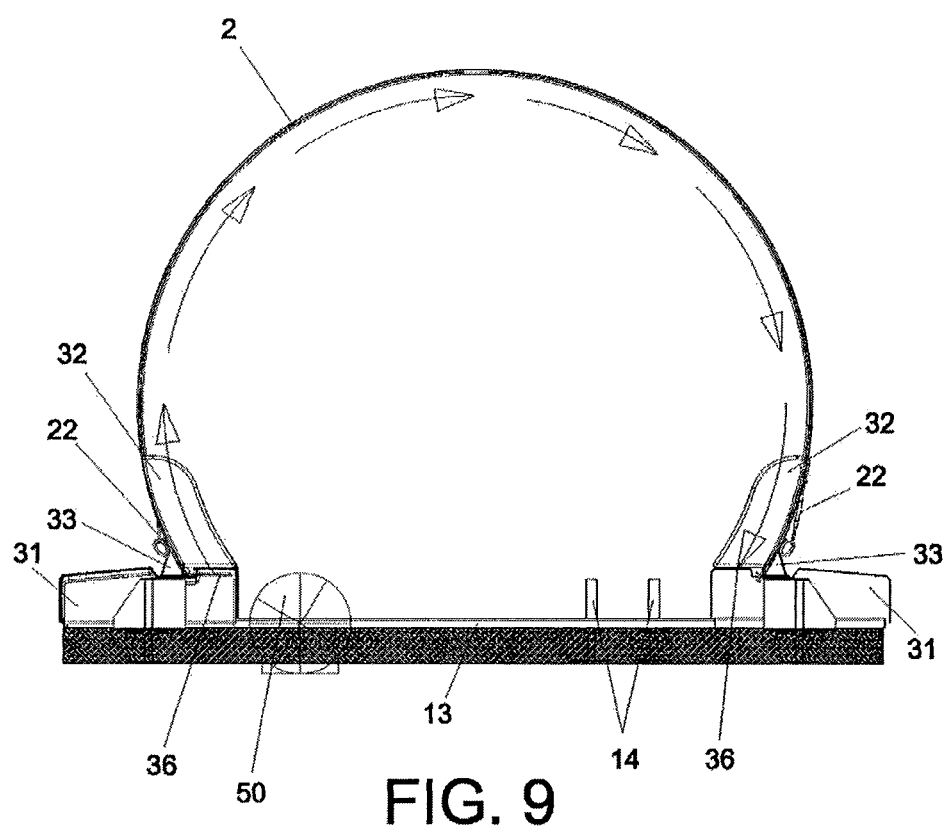
FIG. 9 also shows a front elevational view of the cover that is the object of the invention, wherein ventilation grids for entrance and exit of air can be observed.

Finally, FIG. 9 shows the movement of the air in the interior of the cover that is made to circulate by means of the grids (36) disposed in the aforementioned continuous footings (35). Said air is impelled by a forced ventilation device (50) disposed in the lower part of the cover underneath the conveyor belt and housed between two transverse tubular profiles (13).

The invention claimed is:

1. An arched cover comprising:
    a plurality of longitudinally spaced support arches having an arched configuration, each arch made of metal sheet and having a corrugated profile, each arch having spaced lower ends at opposite distal ends of the arch,
    a plurality of longitudinally extending transparent polycarbonate sheets, each sheet disposed between two adjacent arches and overlying and overlapping the arches, each sheet having an arched configuration conforming to the arched shape of the support arches,
    a plurality of support devices for stabilizing the cover on a support surface; each support device having distal ends and extending between the lower ends of at least one of the arches;
    a plurality of fixing devices, one of the fixing devices supported on one of the ends of one of the support devices, another of the fixing devices supported on the other end of the one support device;
    the lower ends of each of the two adjacent arches supported on the fixing devices; and
    a plurality of tightening devices, at least one tightening device provided adjacent each arch, each tightening device overlying and fastening at least one of the transparent sheets to one of the support arches, each of the tightening devices being provided with opposite distal ends, each end of one of the tightening devices is attached to one of the fixing devices, such that when one of the tightening devices is removed from the fixing device one of the sheets can be removed from the adjacent arches.

2. The cover according to claim 1, wherein the fixing devices comprise:
    counterweights, disposed facing each other on either side of the arches, configured to give the cover structural resistance and firmness, and
    longitudinal beams installed over the counterweights, having hooking orifices for attaching by hooking the end of the tightening devices.

3. The cover according to claim 2, wherein the counterweights have an oblique, arched and centered lug, the lugs having outer walls which are configured for receiving and coupling the lower ends of each of the support arches.

4. The cover according to claim 3 wherein the counterweights are hollow and comprised of a plastic material that has been manufactured by rotational moulding.

5. The cover according to claim 1, wherein the tightening devices comprise bands perimetrally disposed over the sheets and the support arches.

6. The cover according to claim 2, wherein the bands have tensioners adapted for hooking into the orifices of the longitudinal beams.

7. The cover according to claim 2, wherein the support devices comprise support structures disposed facing each other underneath the counterweights, the support structures being joined together by transverse tubular profiles configured to give the cover greater stability.

8. The cover according to claim 7, wherein the support devices additionally comprise adaptable legs which allow adaptation of each module to the different heights of the ground where the cover is installed.

9. The cover according to claim 1, further comprising an emergency exit.

10. The cover according to claim 1, wherein further comprising a forced ventilation device adapted to impel air.

* * * * *